(12) United States Patent
Takeda et al.

(10) Patent No.: US 11,942,120 B2
(45) Date of Patent: Mar. 26, 2024

(54) INFORMATION PROCESSING DEVICE, MAGNETIC RECORDING AND REPRODUCING DEVICE, AND MAGNETIC RECORDING AND REPRODUCING SYSTEM

(71) Applicant: KABUSHIKI KAISHA TOSHIBA, Tokyo (JP)

(72) Inventors: Susumu Takeda, Kawasaki Kanagawa (JP); Kenichiro Yamada, Minato Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/822,753

(22) Filed: Aug. 26, 2022

(65) Prior Publication Data
US 2023/0298619 A1 Sep. 21, 2023

(30) Foreign Application Priority Data
Mar. 17, 2022 (JP) .................................. 2022-042038

(51) Int. Cl.
*G11B 5/012* (2006.01)
*G11B 5/127* (2006.01)

(52) U.S. Cl.
CPC .............. *G11B 5/012* (2013.01); *G11B 5/127* (2013.01)

(58) Field of Classification Search
CPC ..... G11B 5/00; G11B 20/10009; G11B 27/36; G11B 20/10; G11B 5/09; G11B 20/18; G11B 5/012; G11B 5/127

USPC .............................................. 360/25, 31, 39
See application file for complete search history.

(56) References Cited

U.S. PATENT DOCUMENTS 8,134,901 B2 * 3/2012 Nakamura ....... G11B 20/10037
369/59.22
2020/0389188 A1 12/2020 Belzer et al.

OTHER PUBLICATIONS

Yuwei Qin, et al., "Deep Neural Network: Data Detection Channel for Hard Disk Drives by Learning," IEEE Trans. on Magnetics, vol. 56, No. 2, 6701108, 8 pages (2020).

* cited by examiner

*Primary Examiner* — Nabil Z Hindi
(74) *Attorney, Agent, or Firm* — Finnegan, Henderson, Farabow, Garrett & Dunner, LLP

(57) ABSTRACT

According to one embodiment, an information processing device includes an acquisition part, and a processor. The acquisition part is configured to acquire a reproduction signal obtained from a recording part. The recording part includes a recording medium. The reproduction signal includes a first signal corresponding to information recorded in the recording medium. The processor is configured to derive a first output and a second output. The first output is obtained by first information being processed by a first processing model. The first information includes the first signal. The second output is obtained by the first information being processed by a second processing model. The processor is configured to output a result of processing the first information based on a third output. The third output is obtained based on the first output, the second output, and the first information.

9 Claims, 9 Drawing Sheets

INFORMATION PROCESSING DEVICE, MAGNETIC RECORDING AND REPRODUCING DEVICE, AND MAGNETIC RECORDING AND REPRODUCING SYSTEM

CROSS-REFERENCE TO RELATED APPLICATIONS

This application is based upon and claims the benefit of priority from Japanese Patent Application No. 2022-042038, filed on Mar. 17, 2022; the entire contents of which are incorporated herein by reference.

FIELD

Embodiments described herein relate generally to an information processing device, a magnetic recording and reproducing device, and a magnetic recording and reproducing system.

BACKGROUND

For example, information that is recorded in a magnetic recording medium or the like is reproduced by an information processing device or the like. For example, the magnetic recording density can be increased by increasing the processing accuracy of the information processing device.

DETAILED DESCRIPTION

Figure 1:
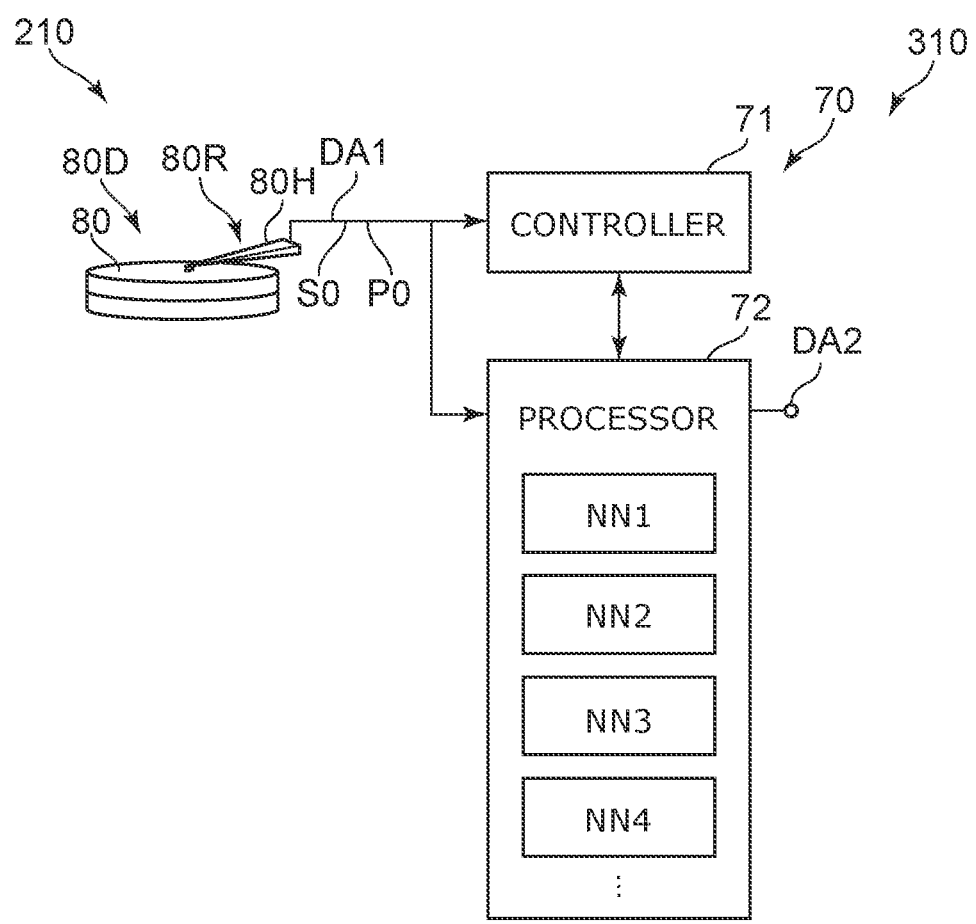
FIG. 1 is a schematic view illustrating an information processing device and an information recording and reproducing device according to a first embodiment.

According to one embodiment, an information processing device includes an acquisition part, and a processor. The acquisition part is configured to acquire a reproduction signal obtained from a recording part. The recording part includes a recording medium. The reproduction signal includes a first signal corresponding to information recorded in the recording medium. The processor is configured to derive a first output and a second output. The first output is obtained by first information being processed by a first processing model. The first information includes the first signal. The second output is obtained by the first information being processed by a second processing model. The processor is configured to output a result of processing the first information based on a third output. The third output is obtained based on the first output, the second output, and the first information.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

First Embodiment

FIG. 1 is a schematic view illustrating an information processing device and an information recording and reproducing device according to a first embodiment.

As shown in FIG. 1, the information recording and reproducing device 210 according to the embodiment includes an information processing device 70 and a recording part 80D. The recording part 80D includes a recording medium 80. The recording medium 80 may include, for example, a magnetic recording medium (a magnetic disk (HDD (Hard Disk Drive)), etc.). The recording part 80D may include, for example, a SSD (Solid State Drive).

The recording part 80D may include, for example, a reproducing part 80R. The reproducing part 80R includes, for example, a magnetic head 80H. Information IOU that is recorded in the recording medium 80 is reproduced by the reproducing part 80R (the magnetic head 80H). A reproduction signal Sr1 that corresponds to the information reproduced from the reproducing part 80R is output. The reproduction signal Sr1 is an electrical signal. Information may be recorded in the recording medium 80 by the magnetic head 80H.

The information processing device 70 includes an acquisition part 71 and a processor 72. The acquisition part 71 is configured to acquire the reproduction signal Sr1 obtained from the recording part 80D that includes the recording medium 80. As described above, the reproduction signal Sr1 includes a first signal S1 that corresponds to the information I00 recorded in the recording medium 80.

In one example, the reproduction signal Sr1 may include information (an attribute P0) related to the first signal S1. In such a case, the attribute P0 is supplied from the recording part 80D to the acquisition part 71 (and the processor 72). In another example, the attribute P0 may not be included in the reproduction signal Sr1. For example, the attribute P0 may be predetermined to correspond to the first signal S1. For example, the attribute P0 may be stored in other storage, etc.; and the attribute P0 may be provided from the other storage to the acquisition part 71 (and the processor 72). The other storage may be included in the information processing device 70. The other storage may be located separately from the information processing device 70. In one example, the attribute P0 is, for example, the recording density (BPI (bit per inch)).

The processor 72 processes the first signal S1 (e.g., a waveform) based on first information I01 that includes the first signal S1. For example, the processor 72 processes the first signal S1 to determine whether the first signal S1 is a first value or a second value. The second value is different from the first value. The first value is, for example, one of "0" or "1", The second value is the other of "0" or "1". A "0/1 determination" is performed by the processor 72. The processor 72 is configured to output a result R1 obtained by the processing performed by the processor 72. The result R1 includes the result of the "0/1 determination". The result R1 includes information related to whether the first signal S1 is the first value or the second value.

According to the embodiment, the processing of the processor 72 is performed based on one or multiple processing models. The processing models include, for example, neural networks.

As shown in FIG. 1, the processor 72 includes, for example, multiple neural networks (multiple processing models). The multiple neural networks include, for example, NN1 (a first neural network), NN2 (a second neural network), NN3 (a third neural network), NN4 (a fourth neural network), etc.

Several examples of operations of the processor 72 of the information processing device 70 according to the embodiment will now be described.

Figure 2:
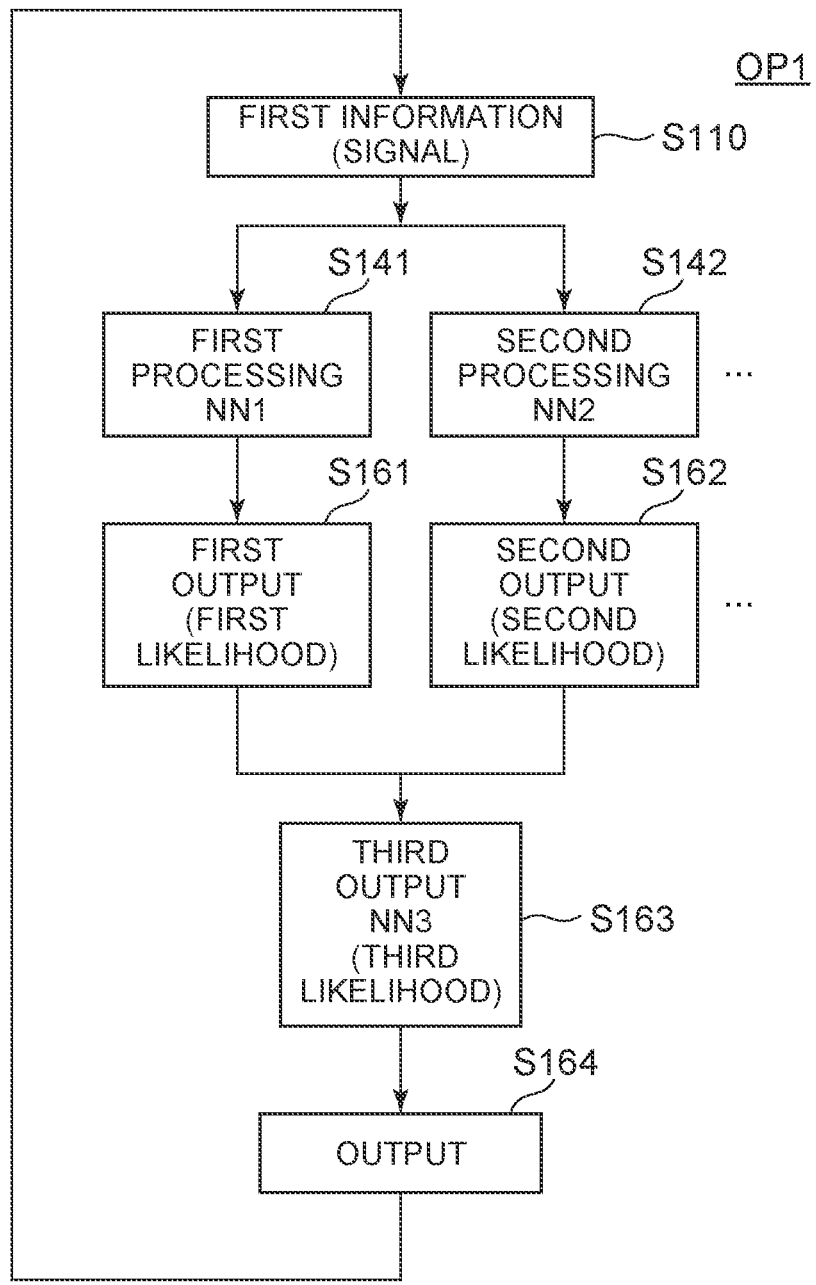
FIG. 2 is a flowchart illustrating an operation of the information processing device and the information recording and reproducing device according to the first embodiment.

FIG. 2 is a flowchart illustrating an operation of the information processing device and the information recording and reproducing device according to the first embodiment.

FIG. 2 illustrates a first operation OP1 performed by the information processing device 70 (or the information recording and reproducing device 210).

As shown in FIG. 2, the processor 72 acquires the first information I01 that includes the first signal S1 (step S110). As described above, the acquisition part 71 acquires the reproduction signal Sr1. The first information I01 that includes the first signal S1 included in the reproduction signal Sr1 is provided to the processor 72.

The processor 72 uses the first processing model to process the first information I01 including the first signal S1 (first processing: step S141). The processor 72 calculates a first likelihood obtained by the first processing (step S161). The processor 72 uses the second processing model to process the first information I01 (second processing: step S142). The processor 72 calculates a second likelihood obtained by the second processing (step S162).

In step S141, for example, the processing is performed by the first neural network NN1 as the first processing model. The first likelihood is obtained thereby. In step S142, for example, the processing is performed by the second neural network NN2 as the second processing model. The second likelihood is obtained thereby. Thus, the processor 72 is configured to derive a first output (e.g., the first likelihood) obtained by the first processing model processing the first information I01 including the first signal S1, and a second output (e.g., the second likelihood) obtained by the second processing model processing the first information I01.

As shown in FIG. 2, the processor 72 derives a third output (e.g., a third likelihood) based on the first output (e.g., the first likelihood) and the second output (e.g., the second likelihood) (third processing: step S163). For example, the third likelihood is obtained by processing by a third processing model (the third neural network NN3).

As shown in FIG. 2, the processor 72 outputs the result R1 (the third output) of the first information I01 processed based on the third likelihood (step S164). After step S164, the flow may return to step S110. In one example, the third output is, for example, the third likelihood. In one example, the third output may include the result of a "0/1 determination".

Figure 3:
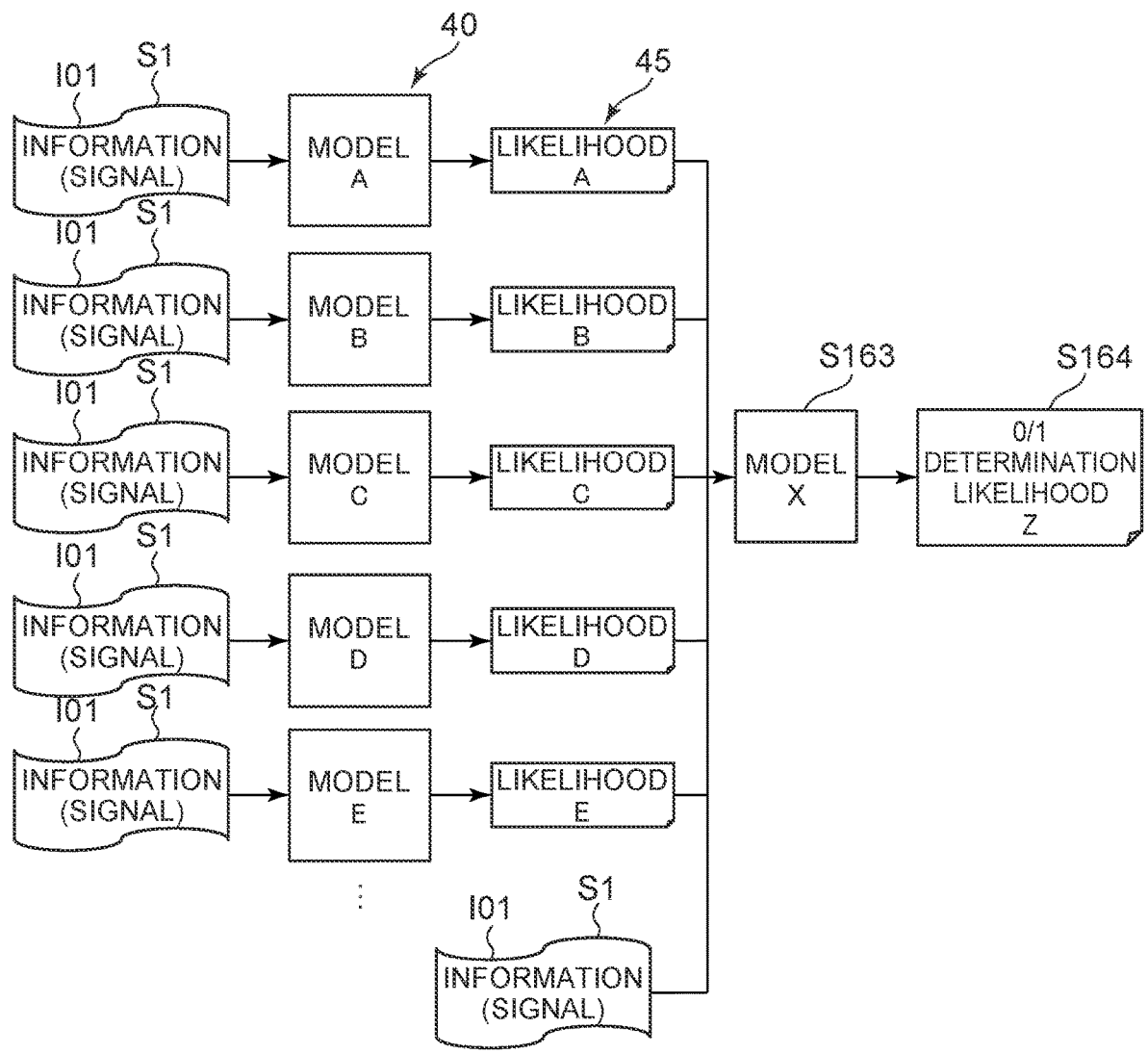
FIG. 3 is a schematic view illustrating an operation of the information processing device and the information recording and reproducing device according to the first embodiment.

FIG. 3 is a schematic view illustrating an operation of the information processing device and the information recording and reproducing device according to the first embodiment.

FIG. 3 illustrates the first operation OP1 described above. As shown in FIG. 3, multiple processing models 40 include, for example, "model A", "model B", "model C", "model D", "model E", . . . , etc. For example, "model A", "model B", "model C", "model D", and "model E" correspond respectively to "BPI-A", "BPI-B", "BPI-C", "BPI-D", and "BPI-E".

Multiple likelihoods 45 are respectively calculated by the multiple processing models 40 processing the first information I01 including the first signal S1. The multiple likelihoods 45 include, for example, "likelihood A", "likelihood B", "likelihood C", "likelihood D", "likelihood E", . . . , etc. For example, a processing model (e.g., "model X") is derived from the multiple likelihoods 45 and the first information I01 including the first signal S1 (step S163). In one example, "model X" may be one of "model A", "model B", "model C", "model D", "model E", . . . , etc. "Model X" may be another model derived from "model A", "model B", "model C", "model D", "model E", . . . , etc. For example, the multiple likelihoods 45 and the first information I01 including the first signal S1 are processed by "model X"; and the output information is used to output "likelihood Z" (the third likelihood) (step S164). For example, a "0/1 determination" is performed using "likelihood Z" (the third likelihood).

For example, the third likelihood (e.g., the likelihood Z) may be output from the processor 72 as the result R1. For example, the result of the "0/1 determination" (the third output) may be output from the processor 72 as the result R1.

In the first operation OP1, the first information I01 that includes the first signal S1 is processed by the multiple processing models 40 (the multiple neural networks); and the multiple likelihoods 45 are derived based on the result. Processing that is based on the third output (the third likelihood, i.e., "likelihood Z") derived based on the multiple likelihoods 45 and the first information I01 is performed, and the third output is output. The "0/1 determination" of the third processing based on the third likelihood can have higher accuracy than, for example, a result of processing based on a likelihood corresponding to the attribute P0 (e.g., the recording density (BPI (bit per inch))) of the first signal S1. According to the embodiment, an information processing device can be provided in which the processing accuracy can be increased.

In the first operation OP1, the result R1 includes information related to whether the first signal S1 corresponds to the first value or whether the first signal S1 corresponds to the second value. For example, the processing of the first information I01 based on the third likelihood (e.g., "likelihood Z") may include a determination (a "0/1 determination") based on the third likelihood of whether the first signal S1 corresponds to the first value or whether the first signal S1 corresponds to the second value.

The first processing model includes, for example, the first neural network NN1 that is machine-learned based on multiple sets of first teacher data including recorded information recorded using a first attribute. The second processing model includes, for example, the second neural network NN2 that is machine-learned based on multiple sets of second teacher data including recorded information recorded using a second attribute. For example, such attributes (the first attribute, the second attribute, etc.) may be related to the recording density (e.g., BPI) of the recording medium 80.

Figure 4:
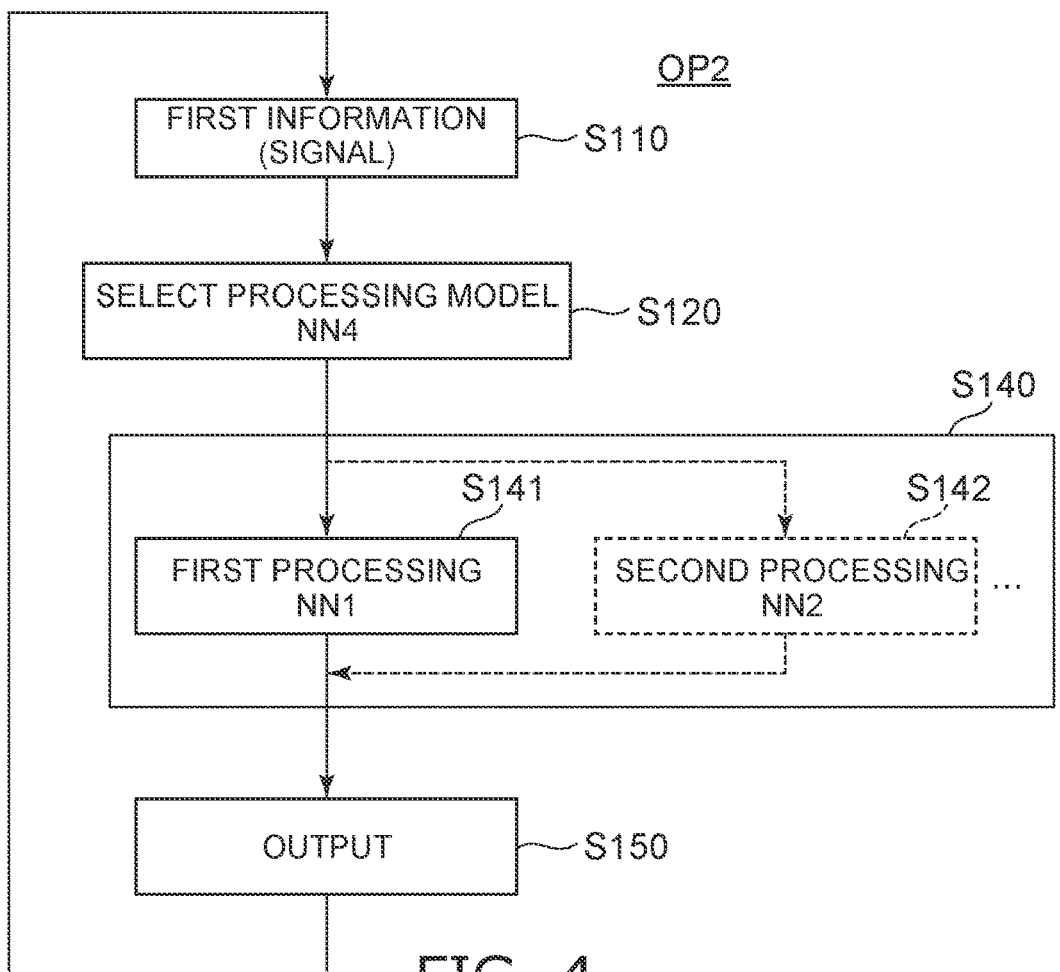
FIG. 4 is a flowchart illustrating an operation of the information processing device and the information recording and reproducing device according to the first embodiment.

FIG. 4 is a flowchart illustrating an operation of the information processing device and the information recording and reproducing device according to the first embodiment.

FIG. 4 illustrates a second operation OP2 performed by the information processing device 70 (or the information recording and reproducing device 210).

As shown in FIG. 4, the processor 72 acquires the first information I01 including the first signal S1 (step S110). As described above, the acquisition part 71 acquires the reproduction signal Sr1. The first information I01 that includes the first signal S1 included in the reproduction signal Sr1 is provided to the processor 72.

The processor 72 selects the first processing model from the multiple processing models based on the first information I01 (step S120). For example, one neural network that is included in the multiple neural networks is selected as the first processing model. In one example, the selected processing may be performed using one of the multiple neural networks (e.g., the fourth neural network NN4).

The processor 72 processes the first information I01 based on the selected processing model (step S140).

For example, when the first processing model (e.g., the first neural network NN1) is selected in step S120, the processor 72 processes the first information I01 based on the first processing model (first processing: step S141).

For example, when the second processing model (e.g., the second neural network NN2) is selected in step S120, the processor 72 processes the first information I01 based on the second processing model (second processing: step S142). In the example, the first processing model is selected in step S120; step S141 is performed in step S140; and step S142 is not performed.

As shown in FIG. 4, the processor 72 outputs the result R1 of the first information I01 processed based on the selected processing model (in the example, the first processing model) (step S150).

According to the embodiment, an appropriate processing model is selected based on the acquired first information I01 including the first signal S1. More appropriate processing can be performed thereby.

For example, there are information processing devices that use neural networks to process signals. A reference example may be considered in which one type of neural network processes signals of various attributes P0 in an information processing device. According to investigations by the inventor, it was found that highly-accurate processing results are not always obtained when attempting to use one neural network to process signals having different characteristics (e.g., attributes P0 such as recording density, etc.).

According to the embodiment, an appropriate processing model is selected from multiple processing models (multiple neural networks). For example, signals that have multiple different characteristics (attributes P0) can be more appropriately processed. According to the embodiment, the processing result is obtained with higher accuracy than in a reference example in which one neural network performs the processing.

As shown in FIG. 4, the flow may return to step S110 after step S150. The operation described above may be repeatedly performed.

Figure 5:
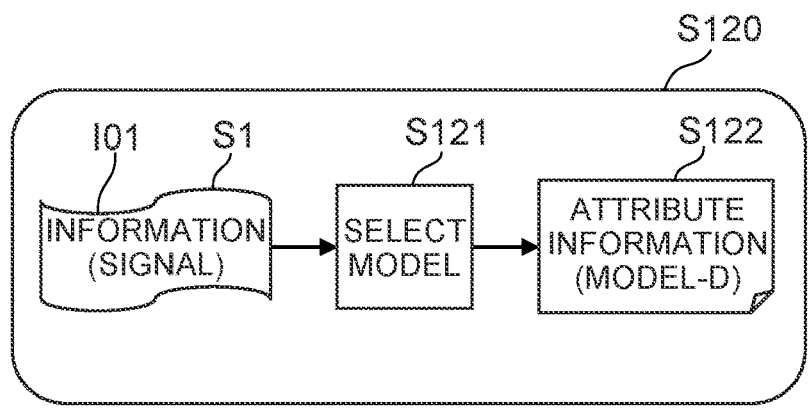
FIG. 5 is a schematic view illustrating the operation of the information processing device and the information recording and reproducing device according to the first embodiment.

FIG. 5 is a schematic view illustrating the operation of the information processing device and the information recording and reproducing device according to the first embodiment.

FIG. 5 illustrates step S120 of the second operation OP2 described above. For example, the processing model is selected based on the first information I01 including the first signal S1 (step S121). For example, the first processing model is selected as the processing model corresponding to the first signal S1 as described above. In the example, the first processing model is "model D" (step S122). For example, "model D" may be associated with attribute information estimated for the first signal S1. For example, the attribute information may correspond to the recording density (e.g., BPI).

Figure 6:
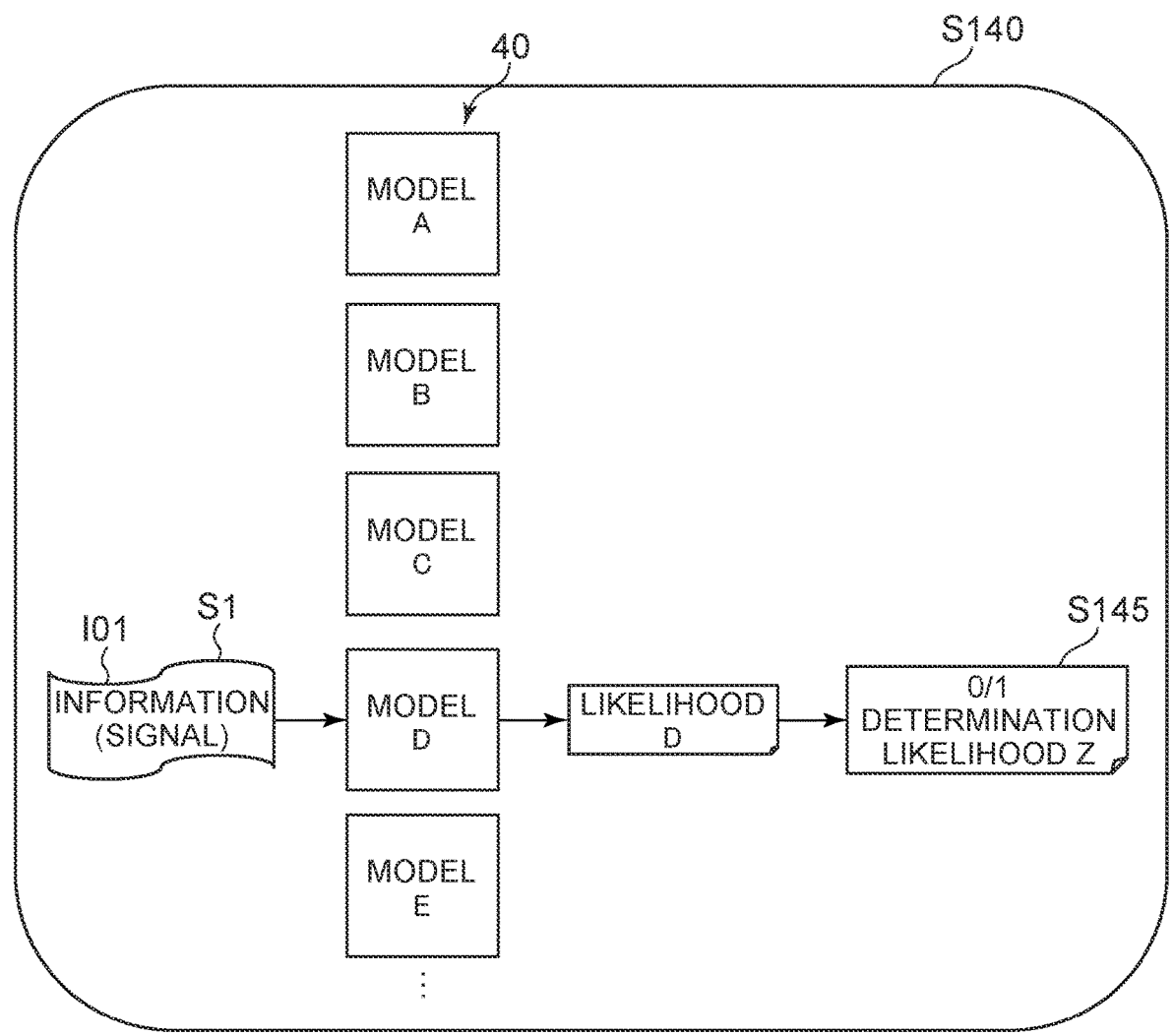
FIG. 6 is a schematic view illustrating the operation of the information processing device and the information recording and reproducing device according to the first embodiment.

FIG. 6 is a schematic view illustrating the operation of the information processing device and the information recording and reproducing device according to the first embodiment.

FIG. 6 illustrates step S140 of the second operation OP2 described above. As shown in FIG. 6, the multiple processing models 40 include "model A", "model B", "model C", "model D", "model E", . . . , etc. For example, "model A", "model B", "model C", "model D", and "model E" correspond respectively to "BPI-A", "BPI-B", "BPI-C", "BPI-D", and "BPI-E".

In the example, "model D" is selected for the first information I01 including the first signal S1 as described above. In such a case, the first information I01 is processed by the selected "model D". For example, "likelihood D" is obtained by the processing. "Likelihood D" is used as "likelihood Z" used in the "0/1 determination" of the first signal S1. In other words, the "0/1 determination" of the first signal S1 is performed using the selected "likelihood D" (step S145).

Thus, in the second operation OP2, the result R1 of the processing of the first information I01 by the first processing model includes information related to whether the first signal S1 corresponds to the first value (one of 0 or 1) or whether the first signal S1 corresponds to the second value (the other of 0 and 1). The result R1 may include, for example, the derived likelihood Z. The result R1 may include, for example, the "0/1 determination" result. The result R1 is output.

The multiple processing models 40 may include an mth processing model (see FIG. 6). "m" is an integer not less than 1 and not more than N. "N" is an integer not less than 2. The mth processing model includes, for example, an mth neural network. For example, the mth neural network is machine-learned based on multiple sets of teacher data that include recorded information recorded using the mth attribute. For example, the mth attribute is related to the recording density (e.g., BPI) of the recording medium 80.

Figure 7:
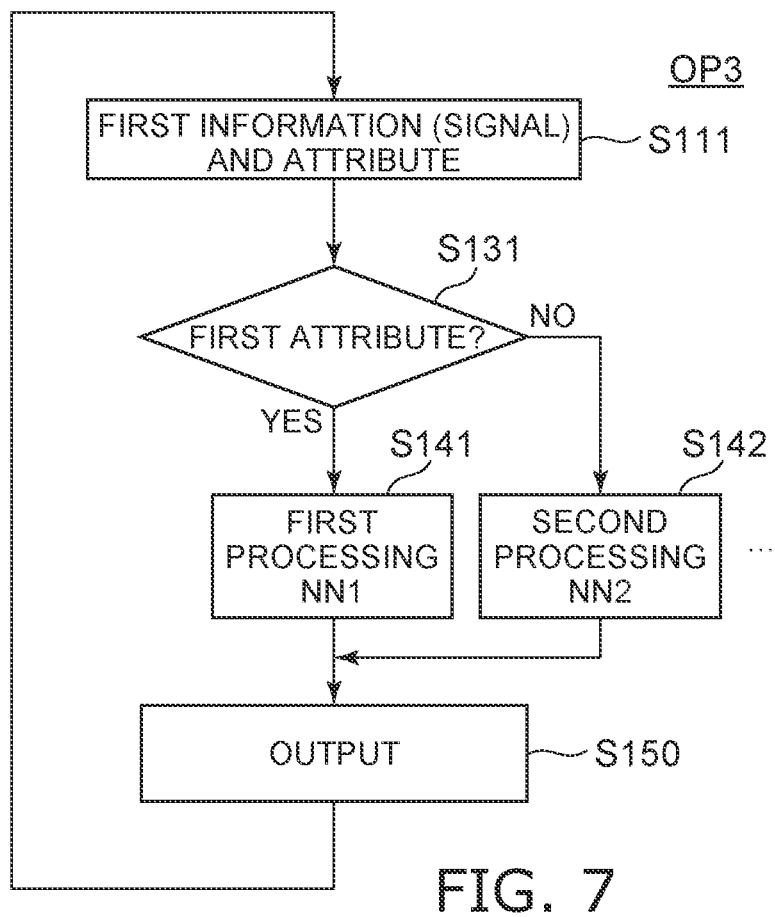
FIG. 7 is a flowchart illustrating an operation of the information processing device and the information recording and reproducing device according to the first embodiment.

FIG. 7 is a flowchart illustrating an operation of the information processing device and the information recording and reproducing device according to the first embodiment.

FIG. 7 illustrates a third operation OP3 performed by the information processing device 70 (or the information recording and reproducing device 210).

In the third operation OP3, the reproduction signal Sr1 (see FIG. 1) includes the first signal S1 that corresponds to the information I00 recorded in the recording medium 80.

As shown in FIG. 7, the processor 72 acquires the attribute P0 and the first information I01 including the first signal S1 (step S111). As described above, the attribute P0 may be included in the reproduction signal Sr1. Or, the attribute P0 may be predetermined to correspond to the first signal S1. For example, the attribute P0 may be provided from another storage, etc.

As shown in FIG. 7, the processor 72 determines whether or not the attribute P0 is the first attribute (step S131). When the attribute P0 is the first attribute, the processor 72 processes the first information I01 by using the first processing model corresponding to the first attribute (first processing: step S141).

When the attribute P0 is not the first attribute, the processor 72 processes the first information I01 by using another processing model (e.g., the second processing model) corresponding to the attribute P0 (second processing: step S142). The first processing includes, for example, processing by the first neural network NN1. The second processing includes, for example, processing by the second neural network NN2.

The processor 72 outputs the result of the first or second processing (step S150). The flow may return to step S111 after step S150.

Thus, in the third operation OP3, the processor 72 outputs the result R1 (see FIG. 1) of the processed first information I01 including the first signal S1 (step S150). When the attribute P0 is the first attribute in the third operation OP3, the result R1 is obtained by using the first processing model corresponding to the first attribute to process the first information I01. When the attribute P0 is the second attribute that is different from the first attribute, the result R1 is obtained by using the second processing model corresponding to the second attribute to process the first information. The second processing model is different from the first processing model. The processing model may correspond to the attribute P0 (e.g., BPI).

In the third operation OP3, the first information I01 that includes the first signal S1 is processed by a processing model corresponding to the attribute P0 of the first signal S1. A highly-accurate processing result is obtained thereby.

In the third operation OP3, for example, when the attribute P0 is the first attribute, the result R1 includes the result of the "0/1 determination" performed based on the first output (e.g., the first likelihood) corresponding to the first attribute. For example, when the attribute P0 is the second attribute, the result R1 includes the result of the "0/1 determination" performed based on the second output (e.g., the second likelihood) corresponding to the second attribute.

In the third operation OP3, the first processing model includes, for example, the first neural network NN1 that is machine-learned based on multiple sets of first teacher data including recorded information recorded using the first attribute. The second processing model includes the second neural network NN2 that is machine-learned based on multiple sets of second teacher data including recorded information recorded using the second attribute.

Figure 8:
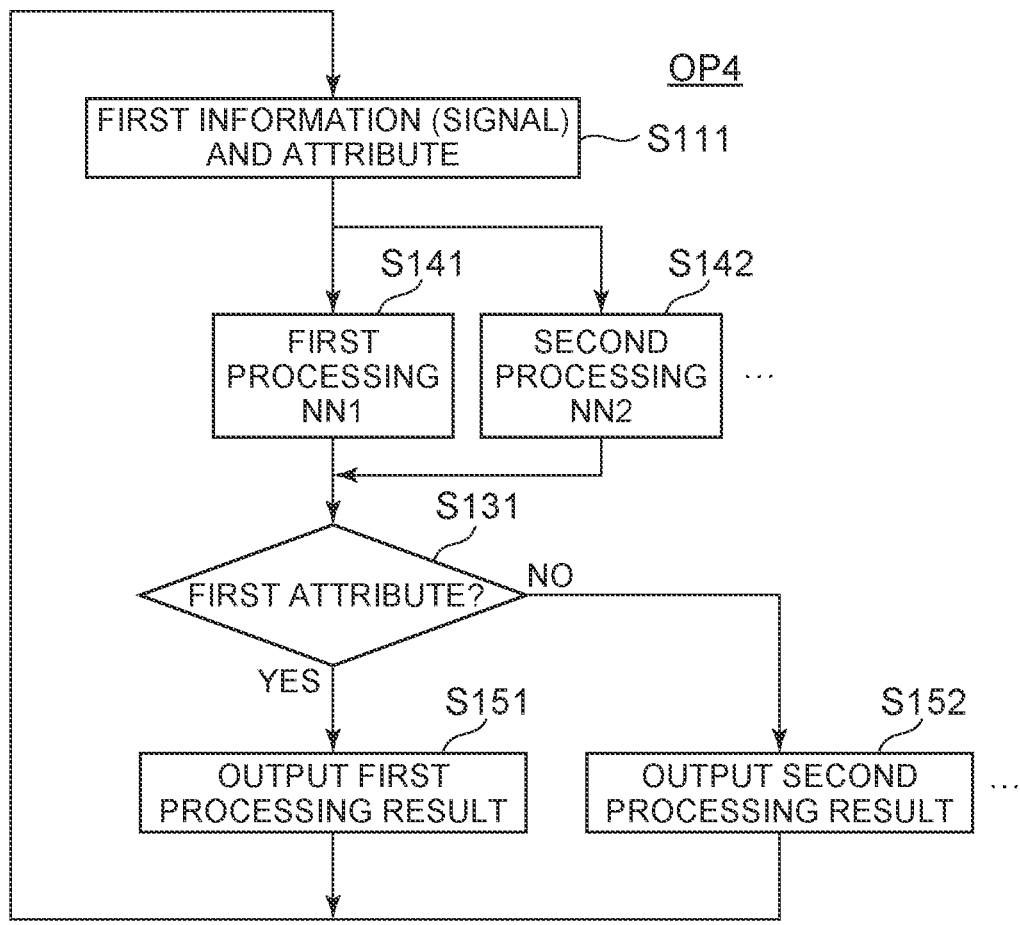
FIG. 8 is a flowchart illustrating an operation of the information processing device and the information recording and reproducing device according to the first embodiment.

FIG. 8 is a flowchart illustrating an operation of the information processing device and the information recording and reproducing device according to the first embodiment.

FIG. 8 illustrates a fourth operation OP4 performed by the information processing device 70 (or the information recording and reproducing device 210).

In the fourth operation OP4, the reproduction signal Sr1 (see FIG. 1) includes the first signal S1 corresponding to the information I00 recorded in the recording medium 80, and the attribute P0 related to the first signal S1.

As shown in FIG. 8, the processor 72 acquires the attribute P0 and the first information I01 including the first signal S1 (step S111).

The processor 72 uses the first processing model corresponding to the first attribute to process the first information I01 including the first signal S1 (first processing: step S141). The processor 72 uses another processing model (the second processing model) corresponding to another attribute (e.g., the second attribute) to process the first information I01 (second processing: step S142). The second processing model is different from the first processing model. The first processing includes, for example, processing by the first neural network NN1. The second processing includes, for example, processing by the second neural network NN2.

The processor 72 determines whether or not the acquired attribute P0 is the first attribute (step S131). When the attribute P0 is the first attribute, the processor 72 outputs a first processing result (step S151). When the attribute P0 is not the first attribute, the processor 72 outputs a second processing result (step S152). The flow may return to step S111 after step S151 or step S152.

Thus, in the fourth operation OP4, when the attribute P0 is the first attribute, the processor 72 outputs the result processed by the first processing model; and when the attribute P0 is the second attribute, the processor 72 outputs the result processed by the second processing model (the result R1: see FIG. 1).

In the fourth operation OP4, the result of the first information I01 including the first signal S1 processed by the processing model corresponding to the attribute P0 of the first signal S1 is output. A highly-accurate processing result is obtained.

In the fourth operation OP4, for example, when the attribute P0 is the first attribute, the result R1 that is output includes the result of the "0/1 determination" performed based on the first output (the first likelihood) corresponding to the first attribute. For example, when the attribute P0 is the second attribute, the result R1 that is output includes the result determined based on the second output (e.g., the second likelihood) corresponding to the second attribute.

In the fourth operation OP4, the first processing model includes the first neural network NN1 that is machine-learned based on multiple sets of first teacher data including recorded information recorded using the first attribute. The second processing model includes the second neural network NN2 that is machine-learned based on multiple sets of second teacher data including recorded information recorded using the second attribute. In the fourth operation OP4, for example, the attribute P0 is related to the recording density (e.g., BPI) of the recording medium 80.

The attribute P0 described above may correspond to multiple ranges related to BPI values. For example, the first attribute may be a first data group corresponding to a range not less than a first BPI value but less than a second BPI value. For example, the second attribute may be a second data group corresponding to a range not less than a third BPI value but less than a fourth BPI value. A part of the data included in the first data group may be the same as at least a part of the data included in the second data group. At least a part of the data included in the first data group may be different from at least a part of the data included in the second data group.

According to the embodiment, for example, the information I00 that is recorded in the recording medium 80 is reproduced by the magnetic head 80H. For example, the reproduced reproduction signal Sr1 is subjected to AD conversion. Waveform equalization processing of the reproduction signal Sr1 may be performed. The signal that is obtained by the AD conversion (or the signal that is obtained by the waveform equalization processing) is decoded. In the decoding, the "0/1 determination" is performed based on the waveform of the digital data. Subsequently, for example, error correction processing that uses LDPC (low-density parity check) or the like is performed. Furthermore, conversion of the bit string is performed according to the encoding scheme. The recorded information I00 is reproduced thereby.

The first to fourth operations OP1 to OP4 according to the embodiment described above are applicable to the decoding.

Figure 9:
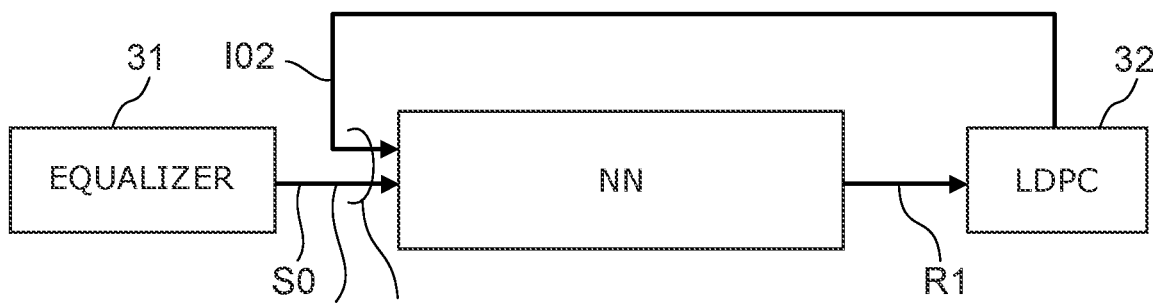
FIG. 9 is a schematic view illustrating an operation of the information processing device and the information recording and reproducing device according to the first embodiment.

FIG. 9 is a schematic view illustrating an operation of the information processing device and the information recording and reproducing device according to the first embodiment.

As shown in FIG. 9, for example, the first signal S1 (e.g., the waveform) may be an output of an equalizer 31. Thus, the first signal S1 may be obtained by equalization processing of at least a part of the reproduction signal Sr1.

For example, the first signal S1 is used to decode one bit. The first signal S1 may include, for example, a signal corresponding to the bit to be decoded and a signal that may affect the signal by interference, etc. For example, the first signal S1 may include the bit to be decoded and the signals corresponding to the preceding and following X bits adjacent to the bit to be decoded. In such a case, the first signal S1 is a signal that corresponds to "2X+1" bits.

For example, the first information I01 that includes the equalized first signal S1 is processed by a neural network (NN). The neural network (NN) is, for example, a "0/1 classifier". For example, the output of the "0/1 classifier" may be processed by processing (e.g., LDPC) by an error corrector 32. The error correction may include, for example, processing based on at least one of ECC (Error-Correcting Code) or LDPC. The processing based on LDPC is one example of error correction processing. For example, the processor 72 may be configured to output information obtained by error correction processing of the result R1.

As shown in FIG. 9, at least a part of the result of the processing of the error corrector 32 may be input to the "0/1 classifier" (NN).

As shown in FIG. 9, in addition to the first signal S1, the first information I01 may further include second information I02 obtained by error correction processing of the result R1. The second information I02 may include, for example, a likelihood obtained by the error correction processing.

In one example, the second information I02 may be, for example, information related to 0/1. In one example, the second information I02 may be the likelihood.

For example, the first decoding is performed using the target bit and the signal corresponding to the adjacent "X" bits (the signal corresponding to the "2X+1" bits). In such a case, the input of the second and subsequent decoding may be the first signal S1 acquired after the second and subsequent decoding and the output of the error corrector 32 corresponding to the previous "2X+1" bits. The output of the error corrector 32 corresponding to the previous "2X+1" bits is, for example, "2X+1" likelihoods corresponding to "2X+1" bits. In such a case, the model of the "0/1 classifier" (NN) has, for example, $(2X+1) \times 2 (=4X+2)$ inputs.

Examples of such processing (decoding) are described below.

FIGS. 10A to 10C and FIG. 11 are schematic views illustrating an operation of the information processing device and the information recording and reproducing device according to the first embodiment.

Figure 10A:
FIG. 10A to 10C are schematic views illustrating an operation of the information processing device and the information recording and reproducing device according to the first embodiment.
Figure 10B:
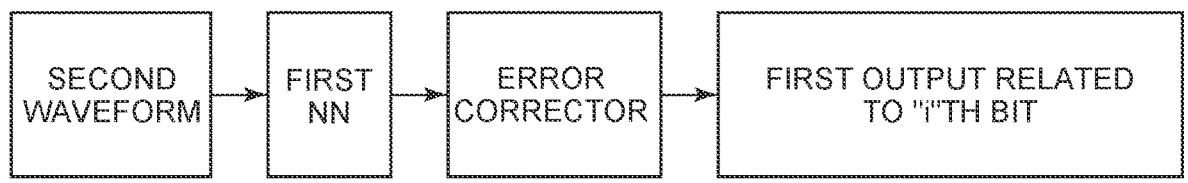
Figure 10C:
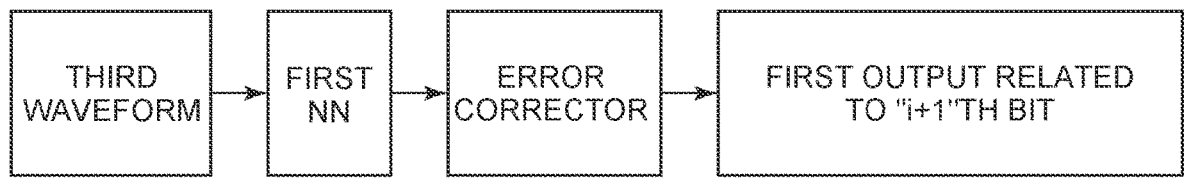

FIGS. 10A to 10C and FIG. 11 illustrates the case when "X" is 1. FIG. 10A illustrates first determination processing related to the "i−1"th bit. "i" is an integer. FIG. 10B illustrates the first determination processing related to the "i"th bit. FIG. 10C illustrates the first determination processing related to the "i+1"th bit.

For example, when a first determination related to the "i"th bit is performed, a second waveform related to the "i"th bit is input to the first NN. The second waveform includes, for example, three pieces of information, i.e., the information corresponding to the "i"th bit, the information corresponding to the "i−1"th bit adjacent to the "i"th bit, and the information corresponding to the "i+1"th bit adjacent to the "i"th bit. The first NN is, for example, a three-input NN. Information related to whether the "i"th bit is the first value or the second value (the first output related to the "i"th bit) is output.

Similarly, for example, when performing the first determination related to the "i−1"th bit, the first waveform related to the "i−1"th bit is input to the first NN. The first waveform includes, for example, three pieces of information, i.e., the information corresponding to the "i−1"th bit, the information corresponding to the "i−2"th bit adjacent to the "i−1"th bit, and the information corresponding to the "i"th bit adjacent to the "i−1"th bit. The first NN is, for example, a three-input NN. Information related to whether the "i−1"th bit is the first value or the second value (the first output related to the "i−1"th bit) is output.

Similarly, for example, when performing the first determination related to the "i+1"th bit, a third waveform related to the "i+1"th bit is input to the first NN. The third waveform is, for example, three pieces of information, i.e., the information corresponding to the "i+1"th bit, the information corresponding to the "i"th bit adjacent to the "i+1"th bit, and the information corresponding to the "i+2"th bit adjacent to the "i+1"th bit. The first NN is, for example, a three-input NN. Information related to whether the "i+1"th bit is the first value or the second value (the first output related to the "i+1"th bit) is output.

Figure 11:
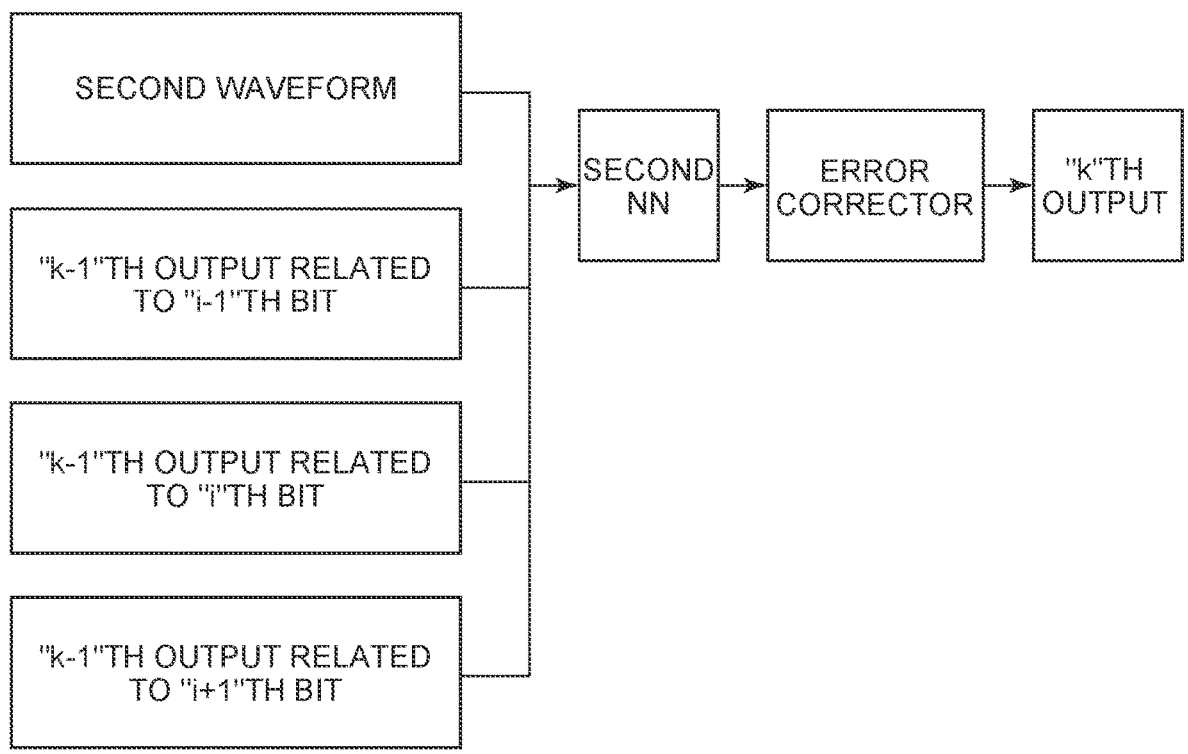
FIG. 11 is a schematic view illustrating an operation of the information processing device and the information recording and reproducing device according to the first embodiment.

For the "i"th bit as shown in FIG. 11, the second waveform, the "k−1"th output related to the "i−1"th bit, the "k−1"th output related to the "i"th bit, and the "k−1"th output related to the "i+1"th bit are input to the second NN. The second NN is, for example, a six-input NN. "k" is an integer not less than 2. When "k" is 2, the first outputs illustrated in FIG. 10B (the first output related to the "i−1"th bit, the first output related to the "i"th bit, and the first output related to the "i+1"th bit) are input.

The first output of the first determination processing illustrated in FIGS. 10A to 10C may be generated using the second NN illustrated in FIG. 11. For example, when generating the first output, set values may be used as the three values of the "k−1"th output related to the "i−1"th bit, the "k−1"th output related to the "i"th bit, and the "k−1"th output related to the "i+1"th bit that are input to the second NN. The set values are, for example, the lower limit, the upper limit, and an intermediate value of the "k−1"th output related to the "i"th bit. For example, when the "k−1"th output related to the "i"th bit is a likelihood represented by a value that is not less than 0 and not more than 1, 0.5 is input as the three values of the "k−1"th output related to the "i−1"th bit, the "k−1"th output related to the "i"th bit, and the "k−1"th output related to the "i+1"th bit.

For example, in the information processing device of the reference example, the output (the waveform) of the equalizer 31 is processed by PRML (Partial Response Maximum Likelihood). For example, the waveform is processed based on a PR model. The "0/1 determination" is performed by further processing by a Viterbi algorithm (e.g., SOVA: soft output Viterbi algorithm).

According to the embodiment, for example, the "0/1 determination" is performed based on a neural network instead of PRML. The processing accuracy can be increased by using an appropriate processing model (neural network).

Second Embodiment

The second embodiment relates to the information recording and reproducing device 210 (see FIG. 1). The information recording and reproducing device 210 includes the recording part 80D and the information processing device according to the first embodiment. The information recording and reproducing device 210 may include the reproducing part 80R. The reproducing part 80R is configured to reproduce the information I00 recorded in the recording part 80D. The reproducing part 80R may be configured to reproduce the attribute P0 and the first signal S1 recorded in the recording part 80D. The reproducing part 80R may include the magnetic head 80H.

A magnetic recording and reproducing system 310 according to the embodiment (see FIG. 1) includes the information processing device according to the first and second embodiments. The magnetic recording and reproducing system 310 may further include, for example, the recording part 80D. The multiple components (e.g., the acquisition part 71, the processor 72, etc.) included in the magnetic recording and reproducing system 310 may be located in different locations. The transmission and reception of information may be performed by any communication method. For example, the multiple parts (e.g., the multiple neural networks, etc.) included in the processor 72 may be located in different locations.

The embodiment may include a program. The program causes a computer (the information processing device 70) to perform the first to fourth operations OP1 to OP4 described above. The embodiment may include a storage medium in which the program is stored.

Embodiments may include the following configurations (e.g., technological proposals).

Configuration 1
An information processing device, comprising:
an acquisition part; and
a processor,
the acquisition part being configured to acquire a reproduction signal obtained from a recording part,
the recording part including a recording medium,
the reproduction signal including a first signal corresponding to information recorded in the recording medium,
the processor being configured to derive a first output and a second output,
the first output being obtained by first information being processed by a first processing model,
the first information including the first signal,
the second output being obtained by the first information being processed by a second processing model,
the processor being configured to output a result of processing the first information based on a third output, and
the third output being obtained based on the first output, the second output, and the first information.

Configuration 2
The information processing device according to Configuration 1, wherein
the result includes information related to whether the first signal corresponds to a first value or whether the first signal corresponds to a second value, and
the second value is different from the first value.

Configuration 3
The information processing device according to Configuration 1 or 2, wherein
the first processing model includes a first neural network,
the first neural network is machine-learned based on a plurality of sets of first teacher data including recorded information recorded using a first attribute,
the second processing model includes a second neural network, and
the second neural network is machine-learned based on a plurality of sets of second teacher data including recorded information recorded using a second attribute.

Configuration 4
An information processing device, comprising:
an acquisition part; and
a processor,
the acquisition part being configured to acquire a reproduction signal obtained from a recording part,
the recording part including a recording medium,
the reproduction signal including a first signal corresponding to information recorded in the recording medium,
the processor being configured to select a first processing model from a plurality of processing models based on first information,
the first information including the first signal,
the processor being configured to output a result of processing the first information based on the first processing model.

Configuration 5
The information processing device according to Configuration 4, wherein
the result includes information related to whether the first signal corresponds to a first value or whether the first signal corresponds to a second value, and
the second value is different from the first value.

Configuration 6
The information processing device according to Configuration 4 or 5, wherein
the plurality of processing models includes an mth processing model,
m is an integer not less than 1 and not more than N,
N is an integer not less than 2,
the mth processing model includes an mth neural network, and the mth neural network is machine-learned based on a plurality of sets of teacher data including recorded information recorded using an mth attribute.

Configuration 7

The information processing device according to Configuration 6, wherein
the mth attribute is related to a recording density of the recording medium.

Configuration 8

An information processing device, comprising:
an acquisition part; and
a processor,
the acquisition part being configured to acquire a reproduction signal obtained from a recording part,
the recording part including a recording medium,
the reproduction signal including a first signal corresponding to information recorded in the recording medium,
the processor being configured to output a result of processing first information,
the first information including the first signal,
when an attribute related to the first signal is a first attribute, the result is obtained by the first information being processed by a first processing model corresponding to the first attribute,
when the attribute is a second attribute, the result is obtained by the first information being processed by a second processing model corresponding to the second attribute,
the second attribute being different from the first attribute,
the second processing model being different from the first processing model.

Configuration 9

The information processing device according to Configuration 8, wherein
when the attribute is the first attribute, the result includes information derived based on a first output and related to whether the first signal corresponds to a first value or whether the first signal corresponds to a second value, the second value being different from the first value, the first output corresponding to the first attribute, and
when the attribute is the second attribute, the result includes information derived based on a second output and related to whether the first signal corresponds to the first value or whether the first signal corresponds to the second value,
the second output corresponding to the second attribute.

Configuration 10

The information processing device according to Configuration 8 or 9, wherein
the first processing model includes a first neural network,
the first neural network is machine-learned based on a plurality of sets of first teacher data including recorded information recorded using a first attribute,
the second processing model includes a second neural network, and
the second neural network is machine-learned based on a plurality of sets of second teacher data including recorded information recorded using a second attribute.

Configuration 11

An information processing device, comprising:
an acquisition part; and
a processor,
the acquisition part being configured to acquire a reproduction signal obtained from a recording part,
the recording part including a recording medium,
the reproduction signal including a first signal corresponding to information recorded in the recording medium,
the processor using a first processing model to process first information including the first signal,
the first processing model corresponding to a first attribute,
the processor using a second processing model to process the first information,
the second processing model corresponding to a second attribute,
the second processing model being different from the first processing model,
the processor being configured to output a result processed by the first processing model when an attribute related to the first signal is the first attribute,
the processor being configured to output a result processed by the second processing model when the attribute is the second attribute.

Configuration 12

The information processing device according to Configuration 11, wherein
when the attribute is the first attribute, the result includes information derived based on a first output and related to whether the first signal corresponds to a first value or whether the first signal corresponds to a second value, the second value being different from the first value, the first output corresponding to the first attribute, and
when the attribute is the second attribute, the result includes information derived based on a second output and related to whether the first signal corresponds to the first value or whether the first signal corresponds to the second value,
the second output corresponding to the second attribute.

Configuration 13

The information processing device according to Configuration 11 or 12, wherein
the first processing model includes a first neural network,
the first neural network is machine-learned based on a plurality of sets of first teacher data including recorded information recorded using a first attribute,
the second processing model includes a second neural network, and
the second neural network is machine-learned based on a plurality of sets of second teacher data including recorded information recorded using a second attribute.

Configuration 14

The information processing device according to any one of Configurations 8 to 13, wherein
the attribute is related to a recording density of the recording medium.

Configuration 15

The information processing device according to any one of Configurations 1 to 14, wherein
the first signal is obtained by equalization processing of at least a part of the reproduction signal.

Configuration 16

The information processing device according to Configuration 15, wherein
the processor is configured to output second information obtained by error correction processing of the result.

Configuration 17

The information processing device according to Configuration 15, wherein
the first information further includes second information obtained by error correction processing of the result.

Configuration 18

A magnetic recording and reproducing device, comprising:
the information processing device according to any one of Configurations 1 to 17;
the recording part; and
a reproducing part configured to reproduce the information recorded in the recording part.

Configuration 19

The magnetic recording and reproducing device according to Configuration 18, further comprising:
a magnetic head including the reproducing part.

Configuration 20

A magnetic recording and reproducing system, comprising:
the information processing device according to any one of Configurations 1 to 17.

Configuration 21

The magnetic recording and reproducing system according to Configuration 20, further comprising:
the recording part.

According to embodiments, an information processing device, a magnetic recording and reproducing device, and a magnetic recording and reproducing system can be provided in which the processing accuracy can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in information processing devices, magnetic recording and reproducing devices, and magnetic recording and reproducing systems such as controllers, processors, recording parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all information processing devices, magnetic recording and reproducing devices, and magnetic recording and reproducing systems practicable by an appropriate design modification by one skilled in the art based on the information processing devices, the magnetic recording and reproducing devices, and the magnetic recording and reproducing systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An information processing device, comprising:
an acquisition part; and
a processor,
the acquisition part being configured to acquire a reproduction signal obtained from a recording part,
the recording part including a recording medium,
the reproduction signal including a first signal corresponding to information recorded in the recording medium,
the processor being configured to output a result of processing first information,
the first information including the first signal,
when an attribute related to the first signal is a first attribute, the result is obtained by the first information being processed by a first processing model corresponding to the first attribute,
when the attribute is a second attribute, the result is obtained by the first information being processed by a second processing model corresponding to the second attribute,
the second attribute being different from the first attribute, and
the second processing model being different from the first processing model,
wherein
the first processing model includes a first neural network,
the first neural network is machine-learned based on a plurality of sets of first teacher data including recorded information recorded using a first attribute,
the second processing model includes a second neural network, and
the second neural network is machine-learned based on a plurality of sets of second teacher data including recorded information recorded using a second attribute.

2. The device according to claim 1, wherein
when the attribute is the first attribute, the result includes information derived based on a first output and related to whether the first signal corresponds to a first value or whether the first signal corresponds to a second value,
the second value being different from the first value,
the first output corresponding to the first attribute, and
when the attribute is the second attribute, the result includes information derived based on a second output and related to whether the first signal corresponds to the first value or whether the first signal corresponds to the second value,
the second output corresponding to the second attribute.

3. The device according to claim 1, wherein
the attribute is related to a recording density of the recording medium.

4. The device according to claim 1, wherein
the first signal is obtained by equalization processing of at least a part of the reproduction signal.

5. The device according to claim 4, wherein
the processor is configured to output second information obtained by error correction processing of the result.

6. The device according to claim 4, wherein
the first information further includes second information obtained by error correction processing of the result.

7. A magnetic recording and reproducing device, comprising:
the information processing device according to claim 1;
the recording part; and
a reproducing part configured to reproduce the information recorded in the recording part.

8. The device according to claim 7, further comprising:
a magnetic head including the reproducing part.

9. A magnetic recording and reproducing system, comprising:
the information processing device according to claim 1.

* * * * *